No. 646,074. Patented Mar. 27, 1900.
P. HOEVEL.
TRANSMISSION CHAIN.
(Application filed July 3, 1899.)
(No Model.)
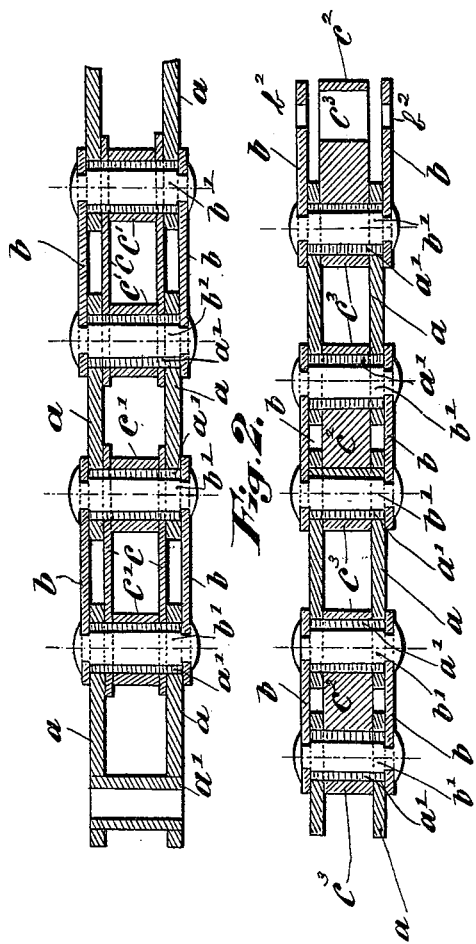

UNITED STATES PATENT OFFICE.

PHILIPP HOEVEL, OF PALLIEN, GERMANY.

TRANSMISSION-CHAIN.

SPECIFICATION forming part of Letters Patent No. 646,074, dated March 27, 1900.

Application filed July 3, 1899. Serial No. 722,615. (No model.)

*To all whom it may concern:*

Be it known that I, PHILIPP HOEVEL, a citizen of the Empire of Germany, residing at Pallien, near Triers, Germany, have invented certain new and useful Improvements in Transmission-Chains, of which the following is a specification.

My present invention relates to transmission-chains, the object being to provide a combined articulation-chain and to reduce the lengthening of the transmission-chains to a minimum; and it consists in the features of construction and combination of parts fully described hereinafter and specifically pointed out in the appended claims; and in order that this my invention may be the more readily understood and carried into effect or practice reference is hereby made to the accompanying drawings, in which—

Figure 1 shows a transmission-chain having double articulations and in which the sprockets of the corresponding wheel engage one articulation. Fig. 2 shows a similar chain in which the sprockets of the corresponding wheel engage two articulations.

The improved transmission-chain, as shown in Fig. 1, is composed of inner links $c$, provided with sockets $c'$, central links $a$, provided with sockets $a'$, and outer links $b$, provided with pins $b'$ and holes $b^2$, through which the said pins pass, the latter being headed outside of the said plates. The links $a$ are connected by means of said links $b$, as well as by means of the links $c$, the pins $b'$ passing through the sockets $a'$, which in turn pass through the sockets $c'$. This arrangement results in a double articulation between said links $a\ b$ and $a\ c$.

The links $c$ of Fig. 1 are open frames, as shown. In Fig. 2 solid bars $c^2$ are used as links instead, having eyes $c^3$ formed in their ends. The combination of the articulations may be further increased by the conjunction of socket-links passing through the sockets of the other links. Thus I may obtain triple, quadruple, &c., articulations.

In the usually-employed chains the traction is supported by the pin and the eyes of the link alone, which therefore is soon worn out, whereby the chain will be lengthened. In my improved chain said traction is distributed to the various parts of each articulation, whereby the chain is effectively prevented from being lengthened in operation.

Having fully described my invention, what I claim, and desire to secure by Letters Patent, is—

1. A transmission-chain consisting of outer links arranged in pairs, intermediate links arranged likewise in pairs, an inner series of links, two series of concentric eyes and pins passing through these eyes as well as through the outer links, said links overlapping at the ends as shown and the said eyes being attached respectively to the inner links and the intermediate links, substantially as set forth.

2. A transmission-chain consisting of the outer links $b$ arranged in pairs, the links $a$ provided with eyes $a'$ extending across the space between the said outer links, inner series of links $c$ arranged in pairs, eyes $c'$ connecting the ends of the said inner links of each pair and surrounding the eyes $a'$ and pins $b'$ which extend through the eyes $a'$ and the openings in the ends of outer links $b$ and are headed outside of the latter to hold all parts of the chain in place, substantially as set forth.

In witness whereof I affix my signature in presence of two witnesses.

PHILIPP HOEVEL.

Witnesses:
ADOLF REUVENGEL,
KARL SCHNEIDER.